United States Patent [19]
Nakanishi et al.

[11] 3,883,013
[45] May 13, 1975

[54] APPARATUS OF APPLYING SKIDS OF GRATING STRUCTURE AND REMOVING THE SAME

[75] Inventors: Taro Nakanishi; Katsumi Takagi; Teiji Ametani, all of Nishinomiya, Hyogo, Japan

[73] Assignee: Mitsubishi Jukogyo Kabushiki Kaisha

[22] Filed: Apr. 16, 1973

[21] Appl. No.: 351,608

[30] Foreign Application Priority Data
Apr. 19, 1972 Japan............................ 47-38713

[52] U.S. Cl...... 214/16.4 A; 214/301; 214/16.1 CC
[51] Int. Cl............................................. B65g 1/06
[58] Field of Search............ 214/16.4 A, 16 B, 152, 214/301, 310, 16.1 CC

[56] References Cited
UNITED STATES PATENTS

| | | | |
|---|---|---|---|
| 3,247,981 | 4/1966 | Johnson | 214/6 P |
| 3,448,867 | 6/1969 | Rayner et al. | 214/8.5 R |
| 3,528,576 | 9/1970 | Runyan et al. | 214/310 |
| 3,578,184 | 5/1971 | Schaich | 214/310 |
| 3,669,288 | 6/1972 | Young | 214/152 |
| 3,675,801 | 7/1972 | Larson | 214/310 |
| 3,690,485 | 9/1972 | Fischer | 214/310 |
| 3,722,719 | 3/1973 | Frank | 214/301 |
| 3,738,506 | 6/1973 | Cornford | 214/16.4 A |
| 3,749,263 | 7/1973 | Foury | 214/152 |
| 3,756,436 | 9/1973 | Lingg | 214/41 |

OTHER PUBLICATIONS
Cleveland Tramrail Bulletin, No. 2038A; 5/1969.

*Primary Examiner*—Robert J. Spar
*Assistant Examiner*—R. B. Johnson
*Attorney, Agent, or Firm*—McGlew and Tuttle

[57] ABSTRACT

Storage racks are aligned in horizontal rows and vertical columns along an aisle, each rack having a pair of laterally-spaced horizontal rails. Receiving and discharge stations are located at one end of the line of racks in vertically-spaced relation, and a skid feeder is located laterally adjacent to stations and extends vertically therebetween. Each station has a vertically-displaceable skidder, including a rectangular grid main frame carrying rollers to support a skid, and a secondary frame carrying rollers movable through the openings in the skidder grid to engage, lift and support a cargo item on a grid then supported on the rollers of the main frame.

8 Claims, 11 Drawing Figures

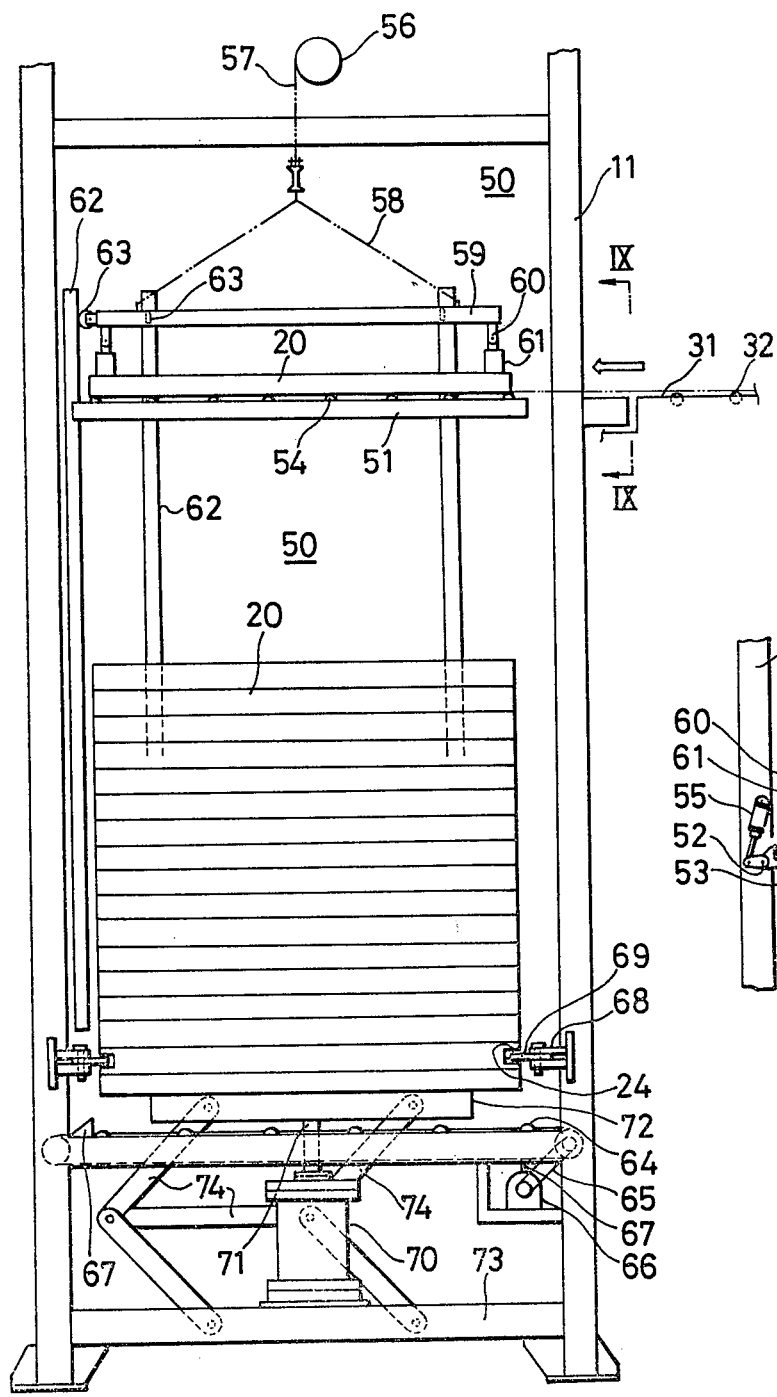
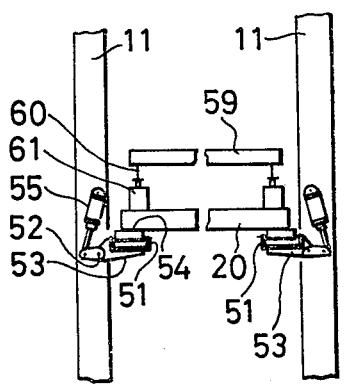
FIG. 8
FIG. 9

APPARATUS OF APPLYING SKIDS OF GRATING STRUCTURE AND REMOVING THE SAME

FIELD AND BACKGROUND OF THE INVENTION

This invention relates to apparatus for receiving, storing and discharging cargo items, such as palletized cargo containers, and, more particularly, to an improved apparatus of this type.

Palletized containers for air cargoes are made lightweight with a sacrifice of strength, and they cannot keep their shapes when being handled unless their entire bottom surface is supported. This has made it impossible for such pallet loads to be handled by fork lifts as in ordinary automatized warehouses.

In an attempt to solve the problem, arrangements have been adopted in some automatized warehouses storing palletized containers for air transportation, wherein the interiors of racks and the lifting carriage of a stacker crane are provided with rows of rollers which, when driven, convey the containers into and out of the racks. The method has the following advantages:

1. Supported on the entire bottom surface, the pallets and containers are protected against damage.
2. Transfer of loads between the stacker crane and racks is accomplished more rapidly than when the loads are handled by a fork lift.

On the other hand, the method has drawbacks. That is:

1. A large number of rollers that have to be mounted over the entire width of each rack add greatly to the initial investment in equipment.
2. The stacker crane must be stopped at any level with extreme accuracy. Otherwise, smooth conveyance on the rollers will not be ensured.
3. The rollers in the rack are driven either by motors and reduction gears installed in the individual racks or by power transmitted from the lifting carriage of the stacker crane via a friction wheel. The former involves high construction cost, and the latter complications in structure.
4. Because a number of rollers must be installed in elevated racks with good accuracy, the equipment cost is increased and maintenance is made difficult.

SUMMARY OF THE INVENTION

It is, therefore, an object of the present invention to provide a method for handling palletized containers without any of the foregoing drawbacks, and an apparatus therefor.

Another object of the invention is to provide a method and apparatus for attaching and detaching skids whereby, when a container with a pallet is to be accommodated in a rack, a skid can be easily laid under the palletized container and, when the container is to be delivered out of the rack, the skid can be easily removed from under the container.

In order to realize the foregoing objects, the invention is characterized in that the skids are made in the form of grated frames, and roller assemblies are provided which can move up into, and move down from, the open spaces of the skid frame, so that, when each load is to be placed on each skid, the rollers protruding upwardly through the frame guide the load onto the skid and then descend to leave the load on the skid, and, when unloading, the rollers ascend to receive the load from the skid and have it conveyed out, the feeding and conveyance of the skid being accomplished by carrying the skid with a conveying roller assembly separately installed for supporting the skid frame.

According to the present invention, as above described, the skids are made of grated frames and roller assemblies that can ascend and descend through the grating are provided, in such a manner that, when a unit load is to be placed on a skid, the roller assembly in its up position will draw the load onto the upper surface of the skid and, when the load is to be discharged, the roller assembly is raised to transfer the load from the skid onto the rollers and thence out of the arrangement, the supply and conveyance of the skid being carried out with a separate skid-conveying roller assembly. Therefore, the arrangement makes it possible to store palletized containers of air cargoes in racks by means of a conventional stacker crane of the fork type. This permits the use of a stacker crane with a simplified lift structure and with low accuracy of lift position.

Also, in accordance with this invention, as many skids are prepared as the rack compartments to enable every article being received to be placed on a skid and every article being shipped out to be deprived of the skid. This eliminates the possibility of any skid being conveyed out of the rack, and greatly simplifies the disposal of empty skids and hence the system itself.

Further, because the invention dispenses with complicated and expensive roller arrangements in the racks, a material saving in cost is realized. The maintenance of equipment is simplified and, without the need of erection work at elevated levels, the construction cost is remarkably low.

These and other objects, features, and advantages of this invention will become more apparent in the detailed description, taken in connection with the accompanying drawings.

BRIEF DESCRIPTION OF THE DRAWINGS

In the Drawings:

FIG. 8 is a detailed front view of the skid feeder;

FIG. 9 is a detail as viewed in the direction of arrows in FIG. 8; and

DESCRIPTION OF THE PREFERRED EMBODIMENT

Figure 1:
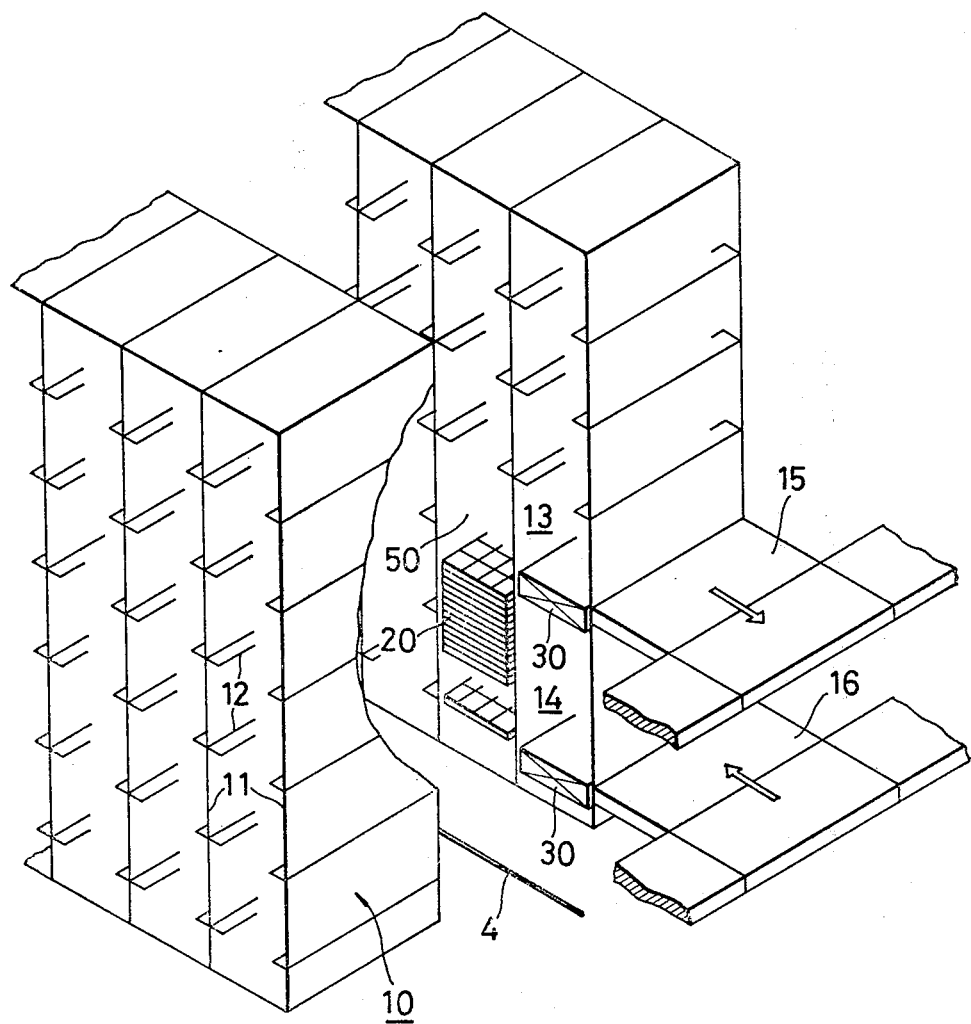
FIG. 1 is a diagrammatic perspective view of an embodiment of the invention in which skids are placed under, and removed from, the bottoms of unit loads.
Figure 2:
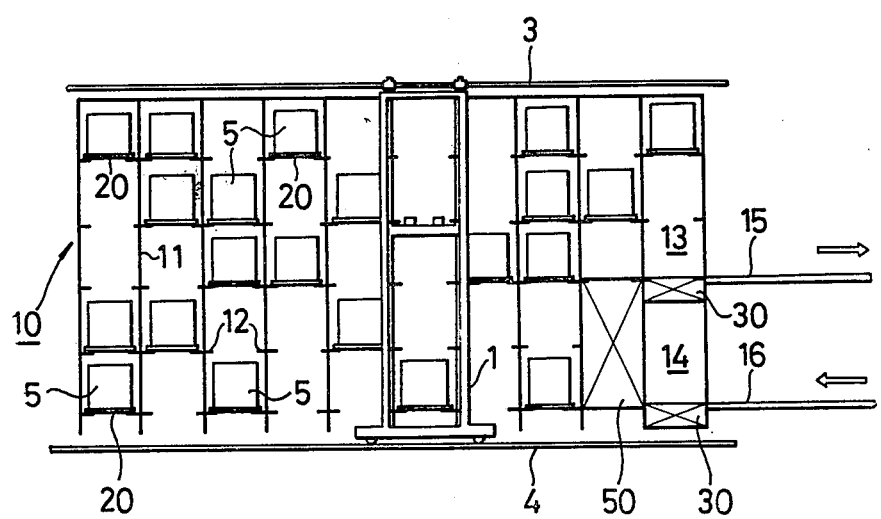
FIG. 2 is a front view of the embodiment.
Figure 3:
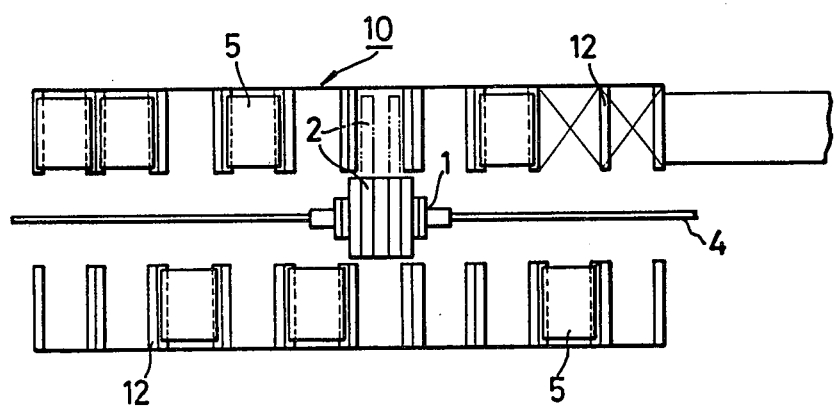
FIG. 3 is a plan view of the embodiment.

Referring to FIGS. 1 to 3, there is shown an ordinary fork-type stacker crane 1 equipped with a fork 2, which travels along overhead and floor rails 3, 4.

On both sides of the aisle where the rails run are arranged racks 10 in parallel rows. The racks consist of corner posts 11 standing upright at given intervals and beams 12 horizontally connecting the posts in depth at given vertical intervals to form tiers. In the upper and lower parts at one end of each rack 10 are located a discharge station 13 and a receiving station 14, respectively. These stations are connected to an issuing conveyor 15 and a receiving conveyor 16 which are driven by conventional drives not shown. Containers 5 for transportation by air, as placed on skids 20 formed as gratings, are carried by the stacker crane 1 and stored in each rack 10 via the receiving station 14 or are delivered out of the rack 10 through the discharge station 13.

Figure 4:
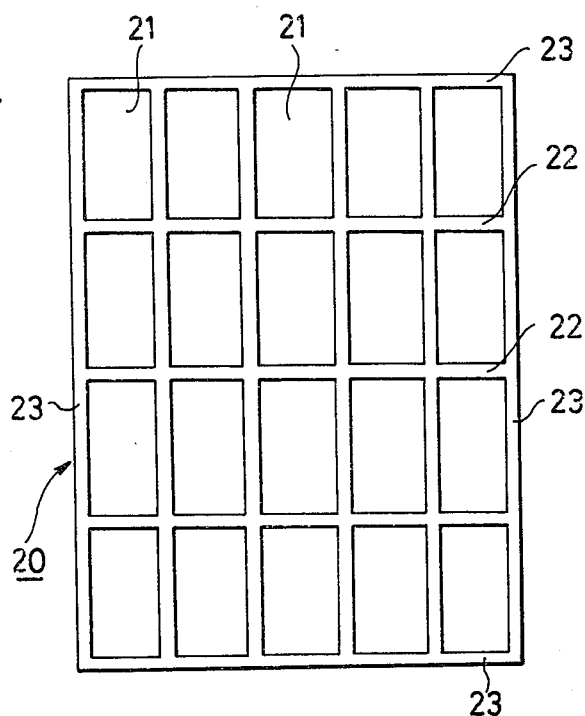
FIG. 4 is a plan view of a skid.

As FIG. 4 shows, each of the skids 20 consists of a grating of latticed bars 22, 23 so crossed as to form rectangular open spaces 21 in a rectangular pattern. The outermost bars 23 are formed with grooves 24 adapted to engage flippers shown in FIG. 8.

The receiving station 14 and issuing station 13 are equipped with skidders 30, one for each, for applying skids to incoming pallet loads and removing them from outgoing loads.

Figure 5:
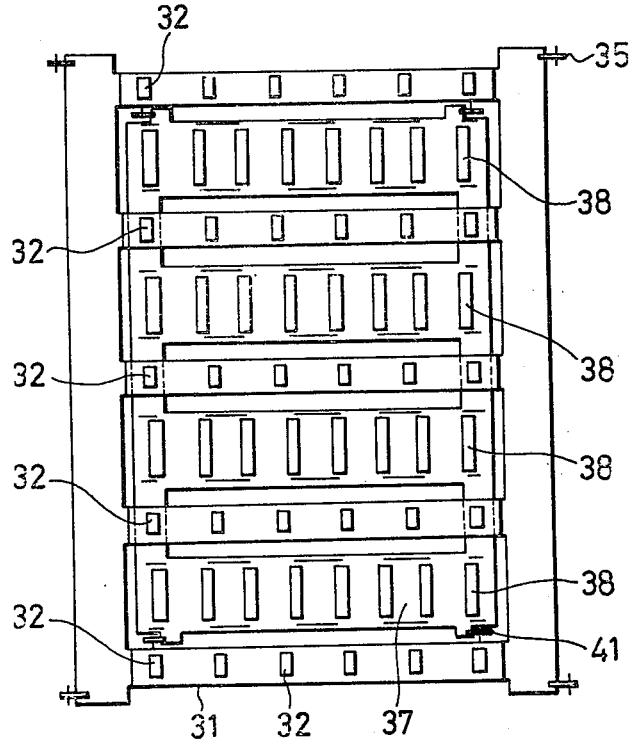
FIG. 5 is a plan view of a skidder used in the above embodiment.
Figure 6:
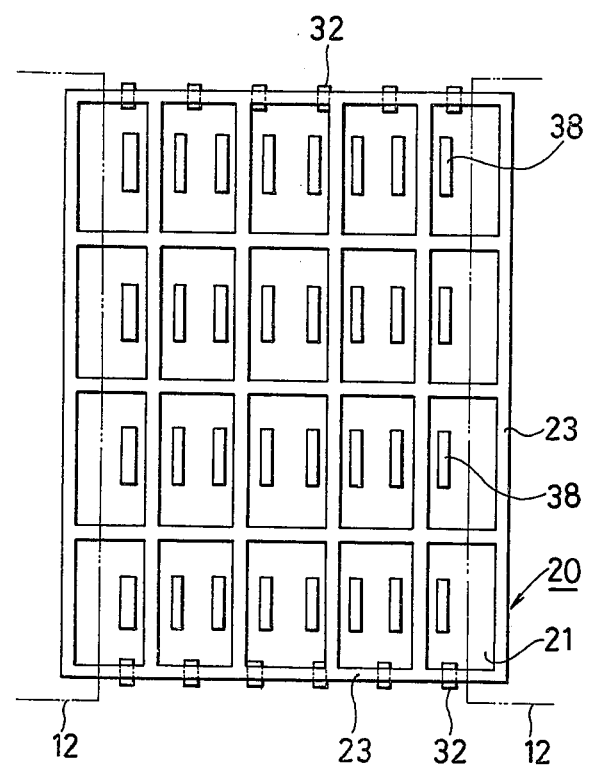
FIG. 6 is a plan view of a skid and the rollers of the skidder in their relative positions.
Figure 7:
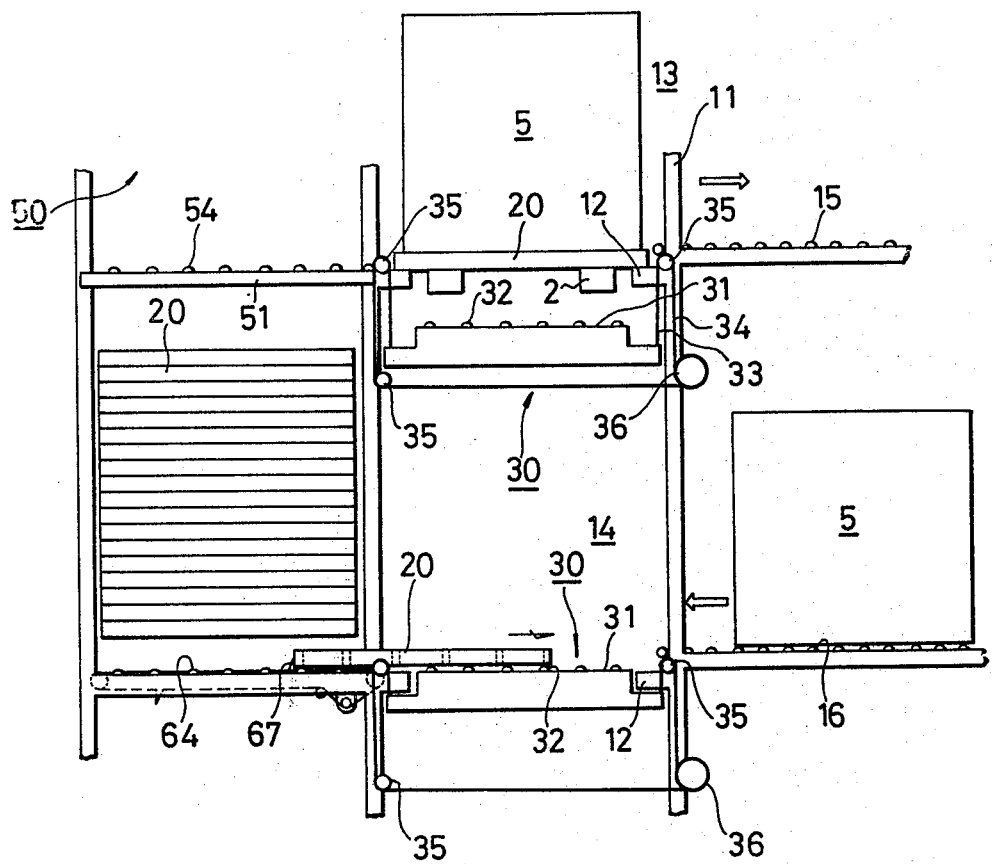
FIG. 7 is a front view of the skidder and a skid feeder.
Figure 10:
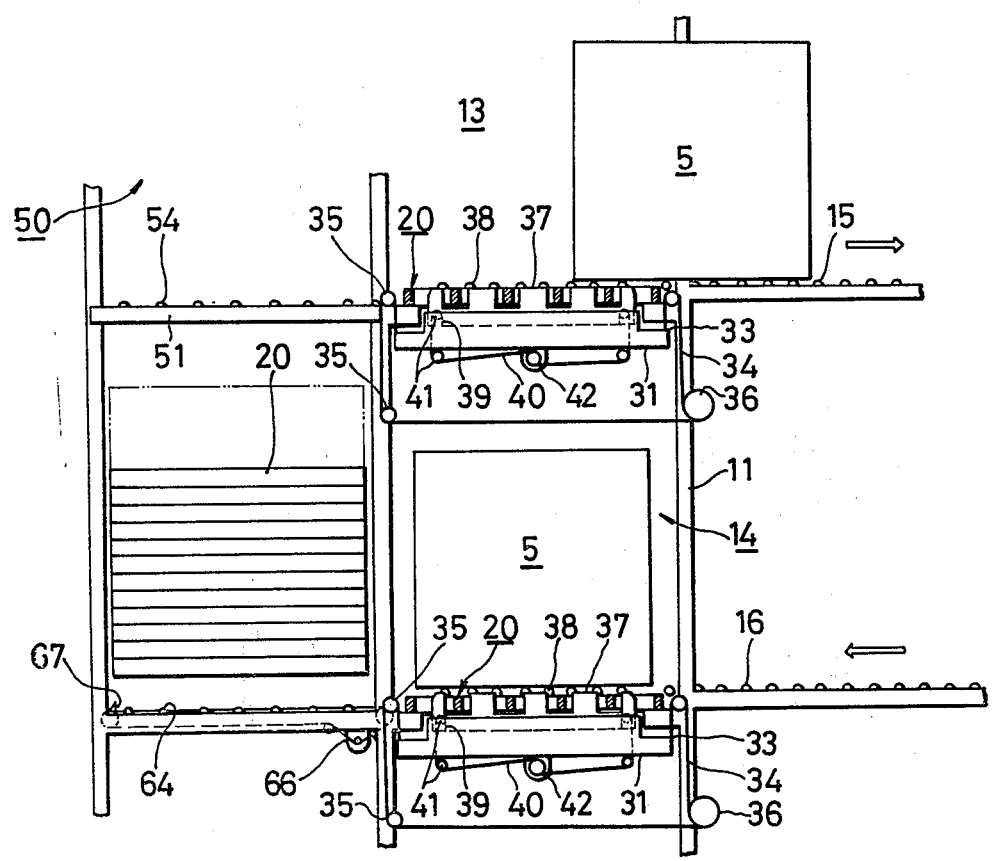
FIGS. 10 and 11 are views similar to FIG. 7 but showing the skidder and skid feeder in their different operating conditions.
Figure 11:
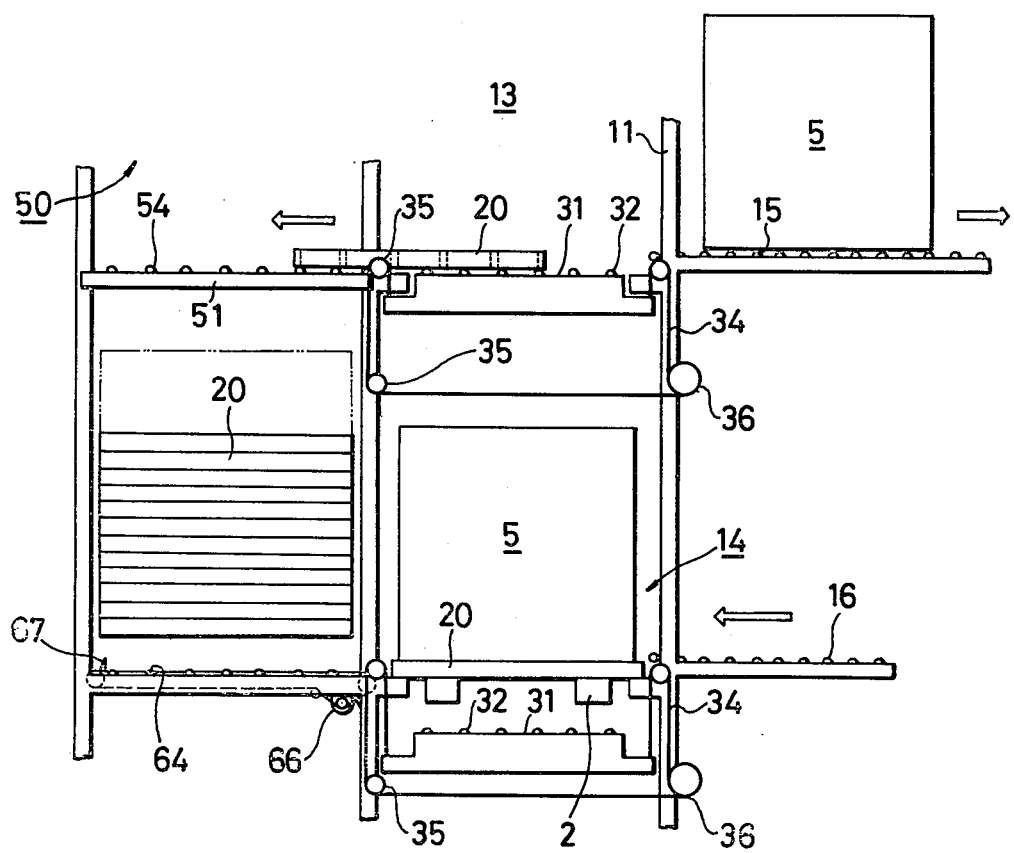

The skidders 30, shown in FIG. 5, are similarly constructed as shown in FIGS. 7, 10 and 11. Each skidder comprises a conveying-roller frame 31 and a plurality of skid-conveying rollers 32 which are rotatably supported by the frame and driven by a conventional drive, not shown. The rollers 32 are arranged in rows corresponding to the bars 22 of the skid 20, as will be clear from FIG. 6. Hoisting chains 34 (FIG. 7) are connected at first ends to both ends of the conveying-roller frame 31 with hoisting joints 33 and are wound at the other ends on a common hoisting drum 36 via sprocket wheels 35 mounted on the rack posts 11. The drum 36 is mounted on a rack post 11 and is driven by an ordinary drive equipped with brake, which is not shown.

A support roller frame 37, which is accommodated in the conveying-roller frame 31, has a configuration such that it can ascend and descend through the open spaces 21 of each skid 20. A plurality of support rollers 38 are rotatably supported by the frame 37 and are driven by a conventional drive, here omitted. Hoisting chains 40 (FIG. 10) are secured at first ends to the both ends of the support roller frame 37 with hoisting joints 39.

Sprockets 41 are rotatably supported by the conveyingroller frame 31, and a chain-hoisting drum 42 is also mounted on the underside of the same frame, so that the hoisting chains 40 can be wound on the drum 42 or unwound therefrom via the sprockets 41. By these windings and unwinding motions of the drum 42 the support roller frame 37 is raised and lowered relative to conveying roller frame 31.

Adjacent the receiving and discharge stations 13, 14, there is located a skid feeder 50 for storing and supplying skids when required, having the following construction. As illustrated in FIGS. 8 and 9, skid-receiving frames 51 are held on the same level as the skidder 30 in the discharge station 13. The frames 51 are integrally secured to brackets 53 which in turn are tiltably pivoted by pins 52. Skid-receiving rollers 54 driven by a drive, not shown, are rotatably supported by the frames 51, and the brackets 53 can be tilted downward or held horizontally by means of air cylinders 55.

Above the skid feeder 50 is mounted a hoisting drum 56, which suspends a frame 59 through a sling chain 58 and a suspending rope 57. To this suspended frame 59 are connected lifting magnets 61 with lift links 60, in such a manner that the lifting magnets 61, upon excitation, attract a skid 20.

In order that the skid 20 suspended by the lifting magnets 61 can be raised or lowered in a stabilized way, guides 62 are fixed to extend vertically and the suspended frame 59 is provided with guide rollers 63 to run in contact with the guides 62.

A skid-delivery conveyor 64, of the free-roller-conveyor, dogged-transfer-chain type, is installed at the same height as the skidder 30 of the receiving station 14. This conveyor is coupled to a motor 66 via a power-transmission chain 65 and, as the motor 66 is driven, a dog 67 provided on the skid-delivery conveyor 64 engages the skid 20 to deliver it onto the skidder 30 of the receiving station 14.

Above the skid-delivery conveyor 64 are provided a pair of skid-flipper brackets 68, which carry flippers 69 adapted to be swiveled about vertical axes by actuators, not shown, into engagement or out of engagement with the grooves 24 of the skid 20.

Underneath the skid feeder 50 is installed a skid-lifting cylinder 70, with a piston 71 that integrally carries a skidlifting platform 72. Skid-lifting stabilizers are foldably interposed between the skid-lifting platform 72 and a support beam 73, so that the platform 72 can be raised or lowered while being horizontally supported by the skid-lifting cylinder 70.

With the construction as illustrated and described above, the embodiment of the invention can operate in the following way.

First, as shown in FIG. 7, the dog 67 of the skid-delivery conveyor 64 feeds a skid 20 onto the conveying-roller frame 31 of the skidder 30 in the receiving station 14 with the aid of the skid-conveying rollers 32, until the skid is above the rack beams 12. As shown in FIG. 10, the conveyor roller frame 31 is lowered slightly so that the skid 20 is caused to rest on the rack beam 12. When the skid 20 has stopped in position, the support roller frame 37 is raised into the open spaces 21 of the skid 20 by the chain-hoisting drum 42 until the support rollers 38 protrude above the upper surface of the skid 20 as shown in FIG. 10. Next, a container 5 is carried by the receiving conveyor 16 into the receiving station 14 and is placed on the skid 20 by means of the support rollers 38.

The chain-hoisting drums 36, 42 are driven in the reverse direction to lower the conveying-roller frame 31 and support roller frame 37 together so that the container 5 is supported by the skid 20 as shown in FIG. 11. Then, the container is suspended on the fork 2 of the stacker crane 1 and carried to and stored in a desired rack compartment 10.

Meanwhile, a container 5 on a skid 10, picked up by the fork 2 of the stacker crane 1 is supported by the rack beams 12 in the discharge station 13 as shown in the upper part of FIG. 7. After the fork 2 has withdrawn, the chain-hoisting drums 36, 42 are driven to pull the conveying-roller frame 31 upward. As a result, the support roller frame 37 is urged into the open spaces 21 of the skid 20, until the container 5 is supported by the support rollers 38 rotatably mounted on the support roller frame 37. These support rollers 38 cooperate with the discharge conveyor 15 to deliver the container 5 out of the discharge station 13.

The container 5 having been shipped out, the support roller frame 37 is lowered from the open spaces 21 of the skid 20 as the chain-hoisting drum 42 is reversed.

Next, the conveying rollers 32 and skid-receiving rollers 54 are driven and the skid 20 is rolled out of the discharge station 15 onto the skid feeder 50, where it is attracted by the lifting magnets 61. The air cylinders 55 cause the skidreceiving frames 51 to tilt downward, and then the hoisting drum 56 pays out the hoisting rope until the skid 20 is placed on a pile of skids 20 in store.

These skids 20 are fed, one at a time, from the skid feeder 50 onto the skidder 30 in the receiving station 14 by the following procedure. First, the skid-lifting cylinder 70 is actuated to raise its piston slightly thereby to form gaps between the edge grooves 24 of a skid 20 and the skid flippers 69, and the flippers are turned sidewise out of engagement with the grooves. Then skid lifting cylinder 7 is lowered through a distance equal to the thickness of a skid, and flippers 69 are rotated to engage the grooves 24 in the next skid above that supported on the lifting cylinder 70. Following this, the cylinder 70, more particularly its piston 71, is further lowered so that the skid 20, thus released, is caused to rest on the skid delivery conveyor 64 for further conveyance.

Thus, in the receiving station 14, a skid 20 is placed under a container 5 by the skidder 30, while the skid 20 under a container 5 picked out of a given rack 10 by an ordinary fork-type stacker crane and placed into the discharge station 13, is removed by the skidder 30 so that the container 5 alone can be shipped out.

The system eliminates in this way any chance of the skids 20 being delivered out of the racks 10, and therefore it is only necessary to use as many skids as the number of rack compartments available.

When the skid feeder 50 has been filled up with skids 20, excess skids may be carried to and stored in an empty rack compartment or compartments by the stacker crane 1. Conversely when the pile of skids in the skid feeder 50 has been depleted by the warehousing of many articles, it may be replenished by the skids 20 transferred back from those rack compartment or compartments by the crane. The skids out of use can thus be handled with utmost ease.

Since the expensive and complicated roller arrangements usually employed in such racks are not required and an ordinary stacker crane can be used, the equipment according to this invention makes a substantial reduction in cost possible.

Further, because it involves no roller installation work in the upper parts of racks, the equipment can be built at a very low cost.

The use of an ordinary stacker crane permits simplification of the structure of the lift platform and requires less exacting tolerances in stop position than heretofore.

While the present invention has so far been described as embodied in a loft automatized storeroom of the type for air cargoes that accommodates palletized containers for transportation by planes, the method and apparatus of the invention are applicable to the rack-type warehouses for general freight, automatized parking buildings for autombiles, etc. as well.

Although the invention has been illustrated in connection with a preferred embodiment thereof, it is to be understood that the invention is not restricted thereto but numerous modifications and alterations in design are possible without departing from the spirit of the invention.

What is claimed is:

1. Apparatus for receiving, storing and discharging items, such as palletized cargo containers, for example, said apparatus comprising, in combination, a plurality of storage racks aligned in horizontal rows and vertical columns along at least one side of at least one aisle, the racks opening toward the associated aisle and each having a pair of laterally spaced horizontal rails extending perpendicularly to the associated aisle; a plurality of skids each comprising a grated frame constituted by a rectangular grid of rectilinear longitudinal and lateral components defining rectangular openings in the frame; a receiving station and a discharge station at one end of each line of racks, each station being aligned with a respective rows of racks and said stations being spaced vertically from each other, with each station having a pair of laterally spaced horizontal rails extending perpendicularly to the associated aisle; an item receiving conveyor extending to said receiving station; an item discharge conveyor extending from said discharge station; respective fork lift means movable longitudinally of each aisle to transfer items, supported on skids, between said racks and said stations; respective skidders mounted for vertical displacement at each station for movement into and out of horizontal alignment with the respective rails at the associated station, each skidder having a main frame to receive and support a grid, and a secondary frame movable vertically relative to said main frame and carrying rollers movable through openings of said main frame and through the openings in a grid supported on said main frame to engage, lift and support an item resting on the grid supported on said frame; and a skid feeder laterally adjacent said station and extending vertically therebetween, said skid feeder including means operable to receive unloaded skids from the skidder at said discharge station, move the unloaded skids vertically to said receiving station, and feed the unloaded skids onto the skidder at said receiving station; the skidder at said receiving station, prior to delivery of an item thereto on said item receiving container, being raised into horizontal alignment with the rails at the receiving station to receive and support an unloaded skid fed from said skid feeder, and its secondary frame being moved upwardly to project its rollers through the openings of the skid to receive the item from said receiving conveyor, after which the secondary frame is lowered for the item to rest on the grid and the skidder at the receiving station is lowered in its entirety to rest the skid on the rails at the receiving station for removal of the loaded skid from the receiving station by the associated fork lift means; the skidder at said discharge station, upon delivery of a skid-supported item to said discharge station by the associated fork lift means to rest on the rails of said discharge station being raised into alignment with the rails to support the skid and the item, and its secondary frame being moved upwardly to project its rollers upwardly through the openings in the grid to engage and lift the item on the grid for transfer to said discharge conveyor, the secondary frame then being lowered and the unloaded grid being moved from the skidder at the discharge station to said skid feeder.

2. Apparatus for receiving, storing and discharging items, as claimed in claim 1, in which said skidder main frame is a rectangular grid with cross members alignable with the lateral components of a grid to receive and support the grid.

3. Apparatus for receiving, storing and discharging items, as claimed in claim 2, including rollers on said cross members to receive and support the lateral components of a grid.

4. Apparatus for receiving, storing and discharging items, as claimed in claim 3, in which said receiving and discharging stations are located in respective racks in the same column spaced vertically apart by at least one rack, said receiving station being located below said discharge station.

5. Apparatus for receiving, storing and discharging items, as claimed in claim 3, in which said means operable to receive unloaded skids from the skidder at said discharge station comprises a pair of laterally spaced frames in said skid feeder swingable about horizontal axes extending longitudinally of said frames between a horizontal position to receive an unloaded skid and a vertical position to provide for lowering of the unloaded skid; said frames having rollers on their upper surfaces to support an unloaded skid; means operable to move said frames between their horizontal and vertical positions; said means for moving the unloaded skids vertically to said receiving station including hoist means operable to grip and support an unloaded skid then positioned on said support frames.

6. Apparatus for receiving, storing and discharging items, as claimed in claim 5, in which said means operable to feed unloaded skids onto the skidder at said receiving station includes conveyor means in said skid feeder at the level of the rails of said receiving station; said means for moving the unloaded skids vertically to said receiving station further comprising a skid platform arranged to receive unloaded skids from said hoisting means; and a fluid pressure actuator connected to said skid platform and operable to raise said skid platform to a skid-receiving position and to lower said skid platform to place an unloaded skid on said conveyor means for movement onto the skidder at said receiving station.

7. Apparatus for receiving, storing and discharging items, as claimed in claim 6, in which said skids are formed with grooves extending longitudinally of a pair of opposite edges thereof; retractable flippers in said skid feeder located above said conveyor means and operable to engage in the grooves of a skid supported on said skid platform to support the skid when said platform is loaded; whereby, a plurality of unloaded skids may be stacked in said skid feeder.

8. Apparatus for receiving, storing and discharging items, as claimed in claim 4, in which said skids are constructed of paramagnetic metal; said hoist means carrying magnets magnetically attracting each unloaded skid as it is moved onto said frames from said discharge station to support the unloaded skid as said frames are swung to their vertical position.

* * * * *